Nov. 18, 1958 — H. F. G. UELTZ ET AL — 2,860,999
SILICON CARBIDE REFRACTORIES
Filed Dec. 16, 1954 — 2 Sheets-Sheet 1

INVENTORS.
HERBERT F. G. UELTZ
NEIL N. AULT
BY *[signature]*
ATTORNEY

Nov. 18, 1958 H. F. G. UELTZ ET AL 2,860,999
SILICON CARBIDE REFRACTORIES
Filed Dec. 16, 1954 2 Sheets-Sheet 2
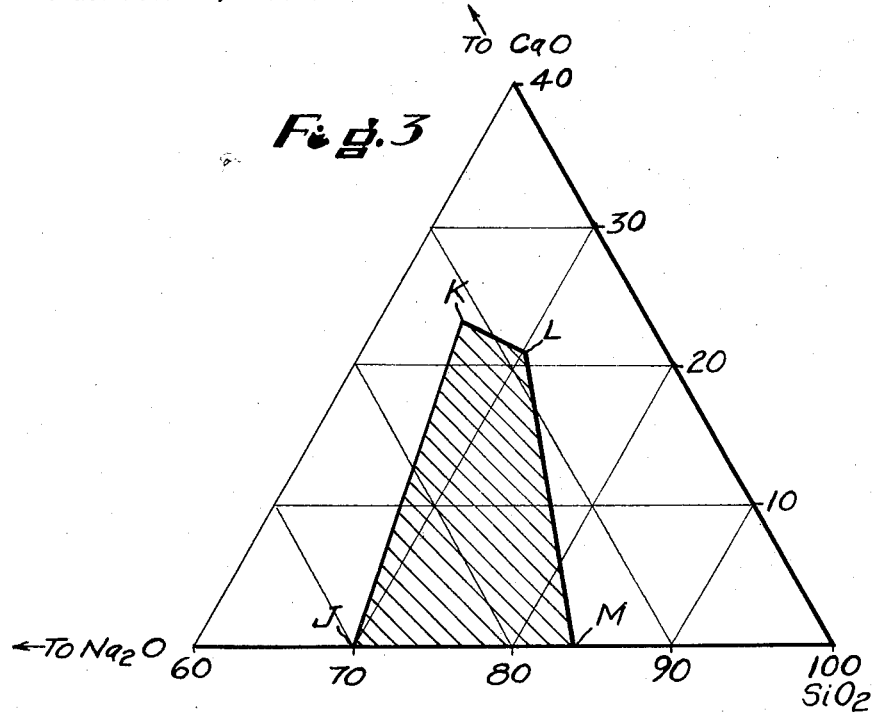
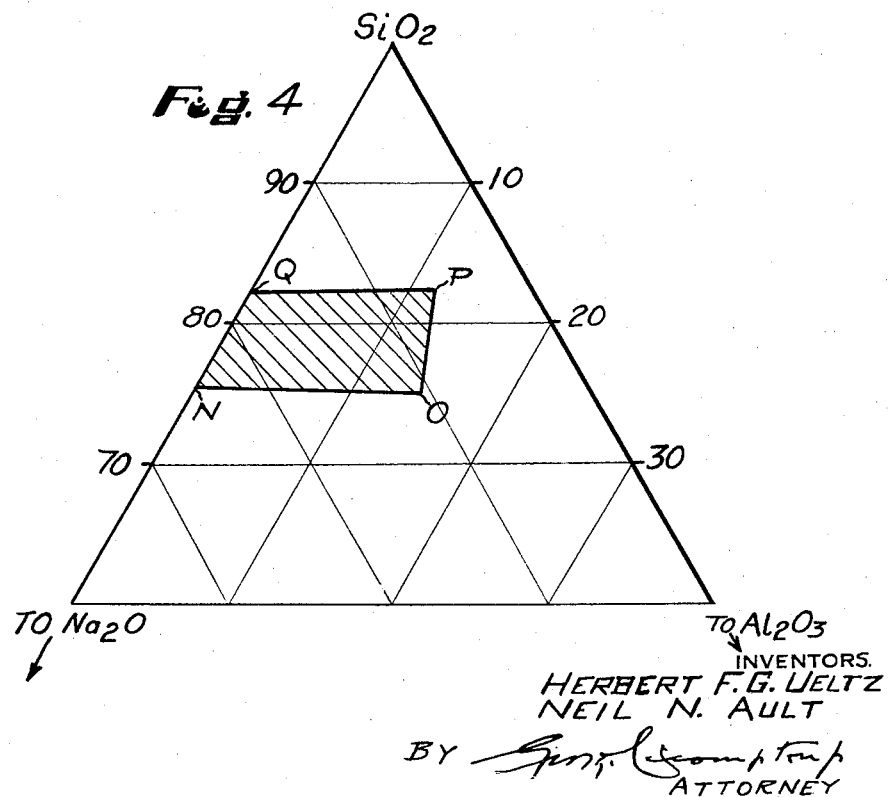
INVENTORS.
HERBERT F. G. UELTZ
NEIL N. AULT
BY
ATTORNEY

United States Patent Office 2,860,999
Patented Nov. 18, 1958

2,860,999

SILICON CARBIDE REFRACTORIES

Herbert F. G. Ueltz, Worcester, and Neil N. Ault, Holden, Mass., assignors to Norton Company, Worcester, Mass., a corporation of Massachusetts Application December 16, 1954, Serial No. 475,846

8 Claims. (Cl. 106—44)

The invention relates to silicon carbide refractories.

One object of the invention is to provide a superior article of silicon carbide for use as kiln furniture, for example for batts, plates, saggers and the like. Another object of the invention is to provide silicon carbide refractories which have superior characteristics for use as slag hole blocks. Another object of the invention is to provide silicon carbide refractories which have superior characteristics for use as tubes for furnaces. Another object of the invention is to provide silicon carbide refractories which have superior characteristics in all of the following respects: strength, lack of glaze, resistance to oxidation, resistance to thermal shock.

Other objects will be in part obvious or in part pointed out hereinafter.

Fig. 3 is a ternary composition diagram of a portion of the system $Na_2O$—$CaO$—$SiO_2$, on which compositions within the range of those defined by the data given on subsequent Table IV, are represented by the shaded area JKLM.

Fig. 4 is a ternary composition diagram of a portion of the system $Na_2O$—$Al_2O_3$—$SiO_2$, on which compositions within the range defined by data on subsequent Table V, are represented by the shaded area NOPQ.

We can use the ordinary black or grey variety of silicon carbide crystallized in the hexagonal system. The purer or green variety could be used but there is no particular advantage in using it. In order to obtain high density we prefer to use a mixture of grit sizes. A practical example is 10 mesh and finer down to the impalpable fines. The objective is to obtain a maximum bulk density of the grain but within the scope of this invention any grit sizes can be used.

Figure 1:
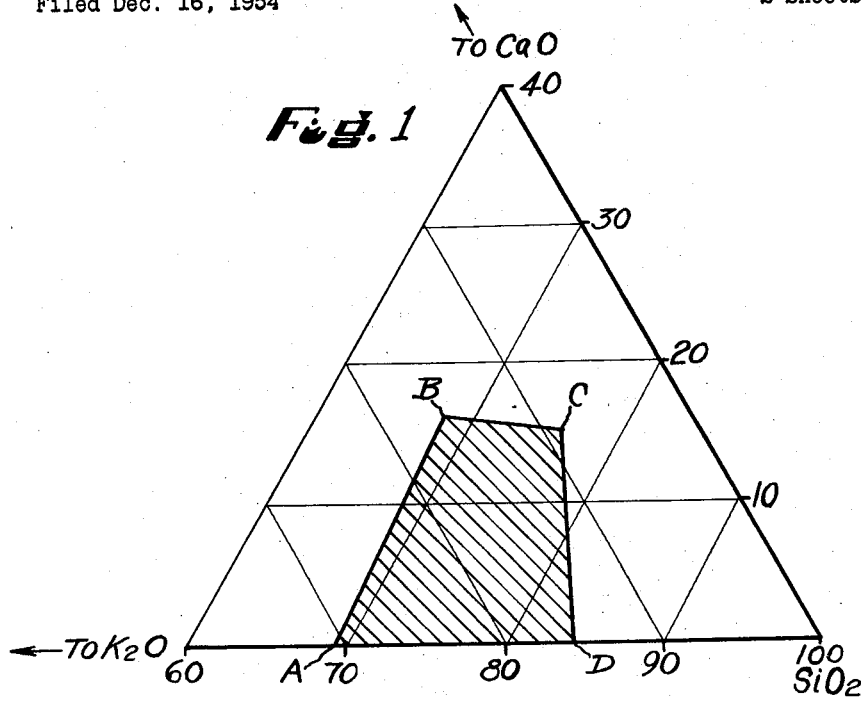
Fig. 1 is a ternary composition diagram of a portion of the system $K_2O$—$CaO$—$SiO_2$ on which the compositions within the range of those defined by the subsequent Table I are represented by the shaded area ABCD.

We provide bonding glass in the form of a frit which is crushed to a fine powder preferably and which has a composition within the compositional area described by the following points on the ternary composition diagram of Figure 1:

TABLE I

|  | Composition Range in Parts by Weight | | | |
|---|---|---|---|---|
| $K_2O$ | 17 | 8 | 14 | 31 |
| $CaO$ | 0 | 16 | 18 | 0 |
| $SiO_2$ | 83 | 76 | 68 | 69 |

The liquidus temperatures of compositions within the limits described above range from about 750° C. to 1250°

C. Our definition of "liquidus temperature" is the temperature under conditions of chemical equilibrium above which the system is completely liquid and at which and below which at least one crystalline phase is present in the system.

After mixing the silicon carbide grain with the bonding glass and with a temporary binder such as a solution of dextrine and water, we charge the mixture into a mold and form the desired article by pressure in the usual way. Or on the other hand we can ram the mixture. Any molding technique can be used. After the thus formed shape has been removed from the mold and allowed to dry it is fired in a kiln to cone 16 and this completes the manufacture of the product. Usually the top temperature of a cone 16 burn, which varies as is well known in the art dependent upon the length of the soaking period, is around 1450° C. It will readily be seen, therefore, that with a glass bond having a liquidus temperature of 1000° C., the bond would, if there were no chemical reaction, be highly fluid during firing. We have found that by using a very small amount of glass bond, which has a low liquidus temperature relative to the soaking temperature during firing, the glass dissolves silica formed by oxidation of some of the silicon carbide, and as the silica content of the bond increases, its liquidus temperature increases. The original liquidus temperature of our bond is in the range of temperature at which silicon carbide begins to oxidize. When this temperature is reached the very fluid glass wets the silicon carbide grains early in the firing cycle. One point is that the smaller silicon carbide grains meaning especially the very fine material starts to oxidize first and normally such oxidation product is a fine fluffy material, around this temperature range of the liquidus temperature given and just above, and this fluffy material would prevent the formation of a silicon carbide refractory having the best properties. But, as in accordance with our invention, this fluffy silica dissolves in the glass as it is formed, there is formed only a negligible amount of such low density crystalline silica which would otherwise tend to separate the grains of silicon carbide and produce a low density product.

We find further advantages in using a very small amount of glass with a low liquidus temperature for the manufacture of a silicon carbide refractory fired to cone 16 or thereabouts. The glass formed does not migrate to the surface and form a glaze. The bond is refractory and gives good strength at high temperatures. The high density products obtained have high resistance to oxidation.

As proof of our theories of what happens in the firing of our products, we have checked the index of refraction of the glass as a glass and the index of refraction of the glassy bond in our fired product and compare that with the index of refraction of pure $SiO_2$ glass which is 1.459. The index of refraction of the glass we use in its preferred composition, which has the molecular formula $K_2O \cdot 2CaO \cdot 9SiO_2$, is 1.518 and the index of refraction of the glassy bond in the fired product using this preferred glass is about 1.476. From this it is evident that there has been a considerable solution of $SiO_2$ formed by oxidation of SiC and it is estimated that the fired bond has a liquidus temperature of at least 1600° C. This temperature is considerably in excess of the firing temperature at soak and in excess of the temperatures at which the product will be used.

The important characteristics of our bond are: (1) that our bond material which we add to the mixture forms a liquid early in the firing cycle as the silicon carbide grain begins to oxidize to form silica, and (2) our bond material plus the silica formed by oxidation has a significantly higher liquidus temperature than the original glass bond. Our glass derived from the bond material should have a liquidus temperature in the range from 700° C. to 1250° C. and be of such a composition that the liquidus temperature of the original glass plus the silica formed by oxidation of silicon carbide is at least 1450° C. For the bond compositions described in Table I, only three components are shown. Other constituents can also be present if the characteristics described above are maintained.

While we prefer to fire our refractories to cone 16, good results according to the invention can be achieved if they are fired to anywhere from cone 14 to cone 20. As is known it is far more accurate and scientific to define the firing by pyrometric cones than by temperatures as results can be better duplicated by measuring the vitrification by the use of standard cones.

*Example 1*

As a specific example of our invention, we made silicon carbide batts out of gray silicon carbide of the following range of grit sizes:

TABLE II

| | Weight percent |
|---|---|
| 10 to 24 mesh | 33 |
| 30 to 90 mesh | 33 |
| 100 mesh and finer | 34 |
| | 100 |

Using 0.5 part by weight of the preferred glass composition $K_2O \cdot 2CaO \cdot 9SiO_2$ with 99.5 parts by weight of the silicon carbide mixture plus 4.5 parts by weight of water and 2 parts by weight of powdered dextrine dissolved therein, we pressed batts of several different sizes under a pressure of two and a half tons per square inch. After drying these were fired in a cone 16 kiln. These batts had all the superior properties listed in the objects and were found to be generally superior to silicon carbide batts previously manufactured.

Figure 2:
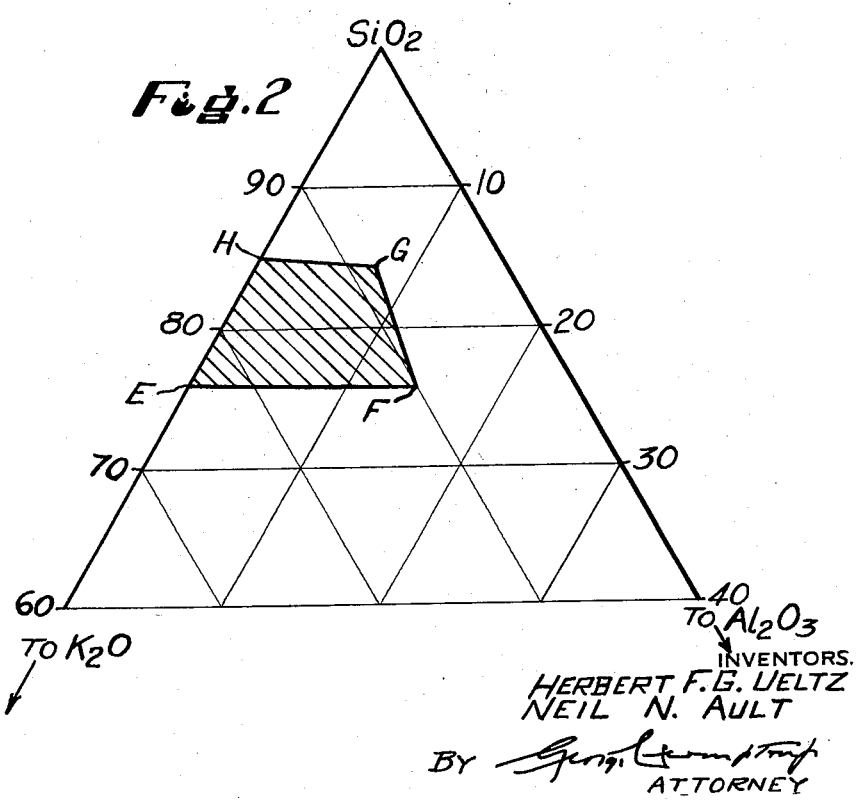
Fig. 2 is a ternary composition diagram of part of the system $K_2O$—$Al_2O_3$—$SiO_2$, on which compositions within the range of those defined by the data of the subsequent Table III are represented by the shaded area EFGH.

In another embodiment of our invention, we provide bonding glass in the form of a frit which is crushed to a fine powder preferably and which has a composition with the compositional area described by the following points on the ternary composition diagram of Figure 2.

TABLE III

| | Composition Range, Parts by Weight | | | |
|---|---|---|---|---|
| $K_2O$ | 24 | 10 | 8 | 16 |
| $Al_2O_3$ | 0 | 14 | 8 | 0 |
| $SiO_2$ | 76 | 76 | 84 | 84 |

The liquidus temperatures of compositions within the composition range described in Table III vary from 850° C. to 1250° C. We use a very low percentage of this potash-alumina glass, our limits being from 0.1% to 2.0% of the glass bond by weight of the total refractory. Our preferred percentage is 0.5% of glass by weight of the total refractory. The procedure of mixing, molding, pressing and/or ramming is the same as already described. This glass in its reaction with silicon carbide has the same characteristics as previously described for the glass of Table I. The preferred glass of this embodiment is 10% $K_2O$, 10% $Al_2O_3$ and 80% $SiO_2$, percentages being by weight. The liquidus temperature of this composition is about 1050° C. The previous remarks about other constituents and the previous remarks about firing to from cone 14 to cone 20, preferably to cone 16, apply. The liquidus temperature of the composition of the original glass plus the silica formed by oxidation is about 1600° C.

*Example 2*

As a specific example of the second embodiment of our invention involving the glass of Table III, we made silicon carbide batts out of black silicon carbide of the same range of grit sizes as in Table II.

Using 0.5 part by weight of the preferred glass composition, 10% $K_2O$, 10% $Al_2O_3$ and 80% $SiO_2$ with 99.5 parts by weight of the silicon carbide mixture and 4.5 parts by weight water and 2 parts by weight of powdered dextrine dissolved therein, we pressed batts of several different sizes under a pressure of two and a half tons per square inch. After drying these were fired in a cone 16 kiln. These batts had all the superior properties listed in the objects and were found to be generally superior to silicon carbide batts previously manufactured.

In another embodiment of our invention, we provide bonding glass in the form of a frit which is crushed to a fine powder preferably and which has a composition within the compositional area described by the following points on the ternary composition diagram of Figure 3:

TABLE IV

| | Composition Range, Parts by Weight | | | |
|---|---|---|---|---|
| $Na_2O$ | 30 | 11 | 8 | 17 |
| $CaO$ | 0 | 23 | 21 | 0 |
| $SiO_2$ | 70 | 66 | 71 | 83 |

The liquidus temperatures of compositions within the composition range described in Table IV vary from 790° C. to 1250° C. We use a very low percentage of this soda-lime glass, our limits being from 0.1% to 2.0% of the glass bond by weight of the total refractory. Our preferred percentage is 0.5% of glass by weight of the total refractory. The procedure of mixing, molding, pressing and/or ramming is the same as already described. This glass in its reaction with silicon carbide has the same characteristics as previously described for the glass of Table I. The preferred glass of this embodiment is 11.4% $Na_2O$, 15.6% $CaO$, and 73% $SiO_2$, percentages being by weight. The liquidus temperature of this composition is 1110° C. The previous remarks about other constituents and the previous remarks about firing to from cone 14 to cone 20, preferably to cone 16, apply. The liquidus temperature of the composition of the original glass plus the silica formed by oxidation is at least 1600° C.

*Example 3*

As a specific example of the third embodiment of our invention involving the glass of Table IV, we made silicon carbide batts out of black silicon carbide of the same range of grit sizes as in Table II.

Using 0.5 part by weight of the preferred glass composition, 11.4% $Na_2O$, 15.6% $CaO$ and 73.0% $SiO_2$ with 99.5 parts by weight of the silicon carbide mixture and 4.5 parts by weight water and 2 parts by weight powdered dextrine dissolved therein, we pressed batts of several different sizes under a pressure of two and a half tons per square inch. After drying these were fired in a cone 16 kiln. These batts had all the superior properties listed in the objects and were found to be generally superior to silicon carbide batts previously manufactured.

In another embodiment of our invention, we provide bonding glass in the form of a frit which is crushed to a fine powder preferably and which has a composition within the compositional area described by the following points on the ternary composition diagram of Figure 4:

TABLE V

|  | Composition Range, Parts by Weight | | | |
|---|---|---|---|---|
| $Na_2O$ | 24 | 10 | 5 | 18 |
| $Al_2O_3$ | 0 | 14 | 12 | 0 |
| $SiO_2$ | 76 | 76 | 83 | 82 |

The liquidus temperatures of compositions within the composition range described in Table V vary from 800° C. to 1250° C. We use a very low percentage of this soda-alumina glass, our limits being from 0.1% to 2.0% of the glass bond by weight of the total refractory. Our preferred percentage is 0.5% of glass by weight of the total refractory. The procedure of mixing, molding, pressing and/or ramming is the same as already described. This glass in its reaction with silicon carbide has the same characteristics as previously described for the glass of Table I. The preferred glass of this embodiment is 10% $Na_2O$, 10% $Al_2O_3$ and 80% $SiO_2$, percentages being by weight. The liquidus temperature of this composition is about 1120° C. The previous remarks about other constituents and the previous remarks about firing to from cone 14 to cone 20, preferably to cone 16, apply. The liquidus temperature of the composition of the original glass plus the silica formed by oxidation is about 1550° C.

*Example 4*

As a specific example of the fourth embodiment of our invention involving the glass of Table V, we made silicon carbide batts out of black silicon carbide of the same range of grit sizes as in Table II.

Using 0.5 part by weight of the preferred composition, 10% $Na_2O$, 10% $Al_2O_3$ and 80% $SiO_2$ with 99.5 parts by weight of the silicon carbide mixture and 4.5 parts by weight water and 2 parts by weight of powdered dextrine dissolved therein, we pressed two batts of several different sizes under a pressure of two and a half tons per square inch. After drying these were fired in a cone 16 kiln. These batts had all the superior properties listed in the objects and were found to be generally superior to silicon carbide batts previously manufactured.

Other formulae can be used for the silicate glass provided the reaction described occurs during firing and the silicate glass originally has a liquidus temperature of from 700° C. to 1250° C. and the bond formed by the reaction between the silicate glass and the silica formed by oxidation of a part of the silicon carbide has a liquidus temperature between 1450° C. and 1700° C. However, so far as the process is concerned, our invention involves reacting a mixture including silicate glass with silicon carbide to raise the liquidus temperature of the oxide constituents to from less than 1250° C. to at least 1450° C. in the fired article.

In certain of the claims the composition is defined in ranges of several components in which each component is given four limits. This defines the composition on the basis of a ternary diagram which is the most accurate scientific way of defining ternary compositions. It describes an area in a ternary diagram to a ceramist which fixes the limits of the composition and in each case it includes all the compositions of the components mentioned which have the characteristics mentioned.

It will thus be seen that there has been provided by this invention silicon carbide refractories in which the various objects hereinabove set forth together with many thoroughly practical advantages are successfully achieved. As many possible embodiments may be made in the above invention and as many changes might be made in the embodiments above set forth, it is to be understood that all matter hereinbefore set forth is to be interpreted as illustrative and not in a limiting sense.

We claim:

1. Silicon carbide refractory article which is the reaction product of a mixture of from 98 to 99.9 parts by weight of silicon carbide with from 2.0 to 0.1 parts by weight of silicate glass which before firing has a liquidus temperature of from 750° C. to 1250° C. and which has a composition within the composition range designated by the shaded area ABCD in Figure 1 and said silicate glass after firing having a liquidus temperature of from 1450° C. to 1700° C., all parts being by weight.

2. Silicon carbide refractory article which is the reaction product of a mixture of from 98 to 99.9 parts of silicon carbide with from 2.0 to 0.1 parts of silicate glass which before firing has a liquidus temperature of from 850° C. to 1250° C. and which has a composition within the limits of composition range designated by the shaded area EFGH in Figure 2 and said silicate glass after firing having a liquidus temperature of from 1450° C. to 1700° C., all parts being by weight.

3. Silicon carbide refractory article which is the reaction product of a mixture of from 2.0 parts to 0.1 part of silicate glass which before firing has a liquidus temperature of from 790° C. to 1250° C. and which has a composition within the limits of composition range designated by the shaded area JKLM in Figure 3, and said silicate glass after firing having a liquidus temperature of from 1450° C. to 1700° C., all parts being by weight.

4. Silicon carbide refractory article which is the reaction product of a mixture of from 98 parts to 99.9 parts of silicon carbide with from 2.0 parts to 0.1 part of silicate glass which before firing has a liquidus temperature of from 800° C. to 1250° C. and which has a composition within the limits of composition range designated by the shaded area NOPQ in Figure 4, and said silicate glass after firing having a liquidus temperature of from 1450° C. to 1700° C., all parts being by weight.

5. The process of making a refractory silicon carbide article which comprises molding, drying and firing under oxidizing firing conditions to from pyrometric cone 14 to pyrometric cone 20 a mixture of from 98 to 99.9 parts by weight of silicon carbide with from 2.0 to 0.1 parts by weight of silicate glass having before firing a liquidus temperature of from 700° C. to 1250° C., thereby causing a reaction between the silicate glass and the silica formed by oxidation of a part of the silicon carbide which adds to the glass and raises the liquidus temperature of the oxide constituents to from less than 1250° C. to at least 1450° C. in the fired article, said silicate glass having before firing a composition within the range designated by the shaded area ABCD in Figure 1.

6. The process of making a refractory silicon carbide article which comprises molding, drying and firing under oxidizing firing conditions to from pyrometric cone 14 to pyrometric cone 20 a mixture of from 98 to 99.9 parts by weight of silicon carbide with from 2.0 to 0.1 parts by weight of silicate glass having before firing a liquidus temperature of from 700° C. to 1250° C., thereby causing a reaction between the silicate glass and the silica formed by oxidation of a part of the silicon carbide which adds to the glass and raises the liquidus temperature of the oxide constituents to from less than 1250° C. to at least 1450° C. in the fired article, said silicate glass having before firing a composition within the range designated by the shaded area EFGH in Figure 2.

7. The process of making a refractory silicon carbide article which comprises molding, drying and firing under oxidizing firing conditions to from pyrometric cone 14 to pyrometric cone 20 a mixture of from 98 to 99.9 parts by weight of silicon carbide with from 2.0 to 0.1 parts by weight of silicate glass having before firing a liquidus temperature of from 700° C. to 1250° C., thereby causing a reaction between the silicate glass and the silica formed by oxidation of a part of the silicon carbide which adds to the glass and raises the liquidus temperature of the oxide constituents to from less than 1250° C. to at least 1450° C. in the fired article, said silicate glass having before firing a composition within the range designated by the shaded area JKLM in Figure 3.

8. The process of making a refractory silicon carbide article which comprises molding, drying and firing under oxidizing firing conditions to from pyrometric cone 14 to pyrometric cone 20 a mixture of from 98 to 99.9 parts by weight of silicon carbide with from 2.0 to 0.1 parts by weight of silicate glass having before firing a liquidus temperature of from 700° C. to 1250° C., thereby causing a reaction between the silicate glass and the silica formed by oxidation of a part of the silicon carbide which adds to the glass and raises the liquidus temperature of the oxide constituents to from less than 1250° C. to at least 1450° C. in the fired article, said silicate glass having before firing a composition within the range designated by the shaded area NOPQ in Figure 4.

References Cited in the file of this patent

UNITED STATES PATENTS

| | | |
|---|---|---|
| 1,105,070 | Gage | July 28, 1914 |
| 1,546,616 | Buberl | July 21, 1925 |
| 1,546,833 | Geiger | July 21, 1925 |
| 2,079,110 | Easter et al. | May 4, 1937 |

FOREIGN PATENTS

| | | |
|---|---|---|
| 508,949 | France | Aug. 5, 1920 |